United States Patent [19]

Gilicinski et al.

[11] 4,265,663

[45] May 5, 1981

[54] WAX FORMULATIONS

[75] Inventors: George A. Gilicinski, Tulsa, Okla.; Rodney G. Lawrence, Howell, Mich.

[73] Assignee: Petrolite Corporation, St. Louis, Mo.

[21] Appl. No.: 79,271

[22] Filed: Sep. 27, 1979

[51] Int. Cl.$^3$ .......................... C09G 1/04; C09G 1/12
[52] U.S. Cl. ........................................ 106/10; 106/11; 106/271; 106/285; 260/29.2 M
[58] Field of Search ................... 106/10, 11, 271, 285; 260/29.2 M; 252/310

[56] References Cited

U.S. PATENT DOCUMENTS

| | | | |
|---|---|---|---|
| 2,902,376 | 9/1959 | Beacher et al. | 106/11 |
| 2,949,373 | 8/1960 | Kendall et al. | 106/11 |
| 4,163,673 | 8/1979 | Dechert | 106/11 |

*Primary Examiner*—Theodore E. Pertilla
*Attorney, Agent, or Firm*—Sidney B. Ring; Hyman F. Glass

[57] ABSTRACT

This invention relates to liquid poly(alpha-olefins) in wax solutions or emulsions which when applied to surfaces (such as by way of illustration and not of limitation vinyl, leather, rubber, elastomers, natural and synthetic polymers, sealed and finished wood, painted or enameled metal such as automobile finishes, etc.) are capable of cleaning, preserving, renewing, restoring and improving the appearance, etc., thereof so as to yield a high gloss finish which is durable and has high resistance to water and detergent wash-off. The preferred embodiment contains the liquid poly(alpha-olefins) in conjunction with silicones and most preferably with metal salts such as zinc salts.

6 Claims, No Drawings

WAX FORMULATIONS

Heretofore, various formulations have been used to clean, preserve, restore, renew, improve, etc., the appearance of surfaces including vinyl, leather, rubber, elastomers, natural and synthetic polymers, sealed and finished wood, painted metal, such as automobile finishes, etc. These formulations generally contain the following:

a. Wax or blend of waxes such as carnauba, synthetic waxes, etc., in a solvent system,
b. Aqueous emulsions of waxes with some solvents,
c. Aqueous emulsions of waxes and silicones with some solvents,
d. Silicones, e.g., unsubstituted or substituted dimethylpolysiloxane fluids or mixtures of these in aqueous emulsions,
e. As above but featuring some additives, such as polyols, like glycerine, diethyleneglycol, etc.

Formulations of the type a, b, and c which require generally cumbersome application procedures (buffing), are overall inefficient in producing high gloss, and are subject to build-up. Formulations of the type d and e show little of the above mentioned problems and are capable of producing very high gloss and demonstrable improvements in general appearance. None of the above formulations are durable and generally show little resistance to wash off when exposed to water or detergents. However, it is highly desirable that formulations should not only retain the initial efficiency in terms of gloss and appearance improvements but also feature durability and resistance to water and detergent wash-off.

The following are examples of formulations which have been employed to solve this problem.

1. U.S. Pat. No. 3,956,174 has attempted to solve the problem by incorporating polyols in their formulation Armour—All ®. Testing of such modified formulation failed to show durability and resistance to wash-off by water or detergents.

2. Others have attempted to improve the resistance of their formulations to wash-off by water or detergents through the use of silicone resins like General Electric's SR131 resin or by employing specialty waxes such as American Hoecht's E and F waxes in a solvent system. Some definite improvement can be confirmed in testing these systems on automotive finishes. However, these formulations offer no distinct advantages when used on vinyl, leather, rubber and elastomers.

3. Others attempted to improve the resistance to wash-off of such a product by water and detergents through the incorporation of amino functional silicones, such as Dow Corning's DC531 or DC536 fluids. These water emulsion formulations generally resulted in products subject to instability and were generally found to offer little improvement, if any.

We have now discovered that liquid hydrocarbon polymers in wax solutions or emulsions which when applied to surfaces (such as by way of illustration and not of limitation vinyl, leather, rubber, elastomers, natural and synthetic polymers, sealed and finished wood, painted or enameled metal such as automobile finishes, etc.) are capable of cleaning, preserving, renewing, restoring and improving the appearance thereof, etc., so as to yield a high gloss finish which is durable and has high resistance to water and detergent wash-off. The preferred embodiment employs the liquid hydrocarbon polymer in conjunction with silicones and most preferably in conjunction with metal salts such as zinc salts.

The liquid hydrocarbon polymers of this invention are prepared in the manner of U.S. Pat. No. 2,937,129 which is, by reference, incorporated into the present application as if part hereof.

Thus, the hydrocarbon starting material comprising primarily alpha-olefins is polymerized in the presence of a free radical catalyst at low pressure but sufficient to keep the reactants and product from vaporizing. In practice, one employs temperatures of from about 40° to 250° C. and pressures of less than about 500 psi for a period of 7 to 20 half-lives of the free radical catalyst, and a molar ratio of free radical catalyst to hydrocarbon of about 0.005 to 0.35.

Alpha-olefins may be polymerized to obtain the hydrocarbon polymers of this invention. These include alpha-olefins of the formula $RCH=CH_2$ where R is a hydrocarbon group, such as where R has 3–18 carbons, for example 5 to 15 carbons, but preferably 8 to 12 carbons. Typical alpha-olefins include the following: hexene-1, heptene-1, octene-1, decene-1, undecene-1, dodecene-1, tetradecene-1, etc.

A typical liquid poly(alpha-olefin) is prepared according to U.S. Pat. No. 2,937,129. Specifically, dodecene-1 was polymerized according to the procedure of Example 3 of U.S. Pat. No. 2,937,129 which is incorporated herein as if part hereof.

VYBAR ® 825 which is prepared in the manner of Example 3 of U.S. Pat. No. 2,937,129 is a commercial poly(alpha-olefin) polymer of the Bareco Division of Petrolite Corporation, having the following properties.

| Property | | Test Method | Units | VYBAR ® 825 |
|---|---|---|---|---|
| Melting Point | | ASTM D-36 Mod. | °F. (°C.) | N/A |
| Pour Point | | ASTM D-97 | °F. (°C.) | −30 (−34.4) |
| Viscosity | @ 32° F. (0° C.) | ASTM D-2669 | Centipoise | 6400 |
| | @ 50° F. (10° C.) | | | 2800 |
| | @ 100° F. (37.8° C.) | ASTM D-3236 | | 530 |
| | @ 150° F. (65.6° C.) | | | 157 |
| | @ 210° F. (98.9° C.) | | | 54 |
| | @ 250° F. (121° C.) | | | 31 |
| | @ 300° F. (149° C.) | | | 18 |
| Penetration | @ 77° F. (25° C.) | ASTM D-1321 | 0.1 mn | N/A |
| | @ 110° F. (43° C.) | | | |
| | @ 130° F. (54° C.) | | | |
| | @ 140° F. (60° C.) | | | |
| Density | @ 75° F. (24° C.) | ASTM D-1168 | grams/cc | 0.86 |
| | @ 200° F. (93° C.) | | | — |
| Iodine | | | | |

| Property | Test Method | Units | VYBAR ® 825 |
|---|---|---|---|
| Number | ASTM D-1959 | cg $I_2$/g sample | 30 |
| Color | ASTM D-1500 | | 0.0 |

N/A Not Applicable

A wide variety of waxes can be employed in this invention. In general, an emulsifiable wax is preferred. These include waxes containing chemical groups which facilitate emulsification such as carboxylic or related groups. Examples of emulsifiable waxes include the following:

(1) oxygen-containing wax or oxidized waxes as illustrated by those described in the following patents: natural waxes such as Candellila, carnauba, beeswax, Coconut wax, montan wax (i.e. Hoechst waxes), as well as oxidized petroleum waxes as illustrated by U.S. Pat. Nos. 2,879,237–241; 3,163,548; 4,004,932, etc.

(2) carboxylic adducts such as maleic and related added to waxes such as those described in the following U.S. Pat. Nos.:

3,933,511; 3,933,512, etc. Typical examples are esters, amides, ester-amides, etc. of compositions of one or more of the formulae disclosed in U.S. Pat. Nos. 3,933,511; 3,933,512 (which patents are, by reference, incorporated herein as if part hereof), such as where R is the wax moiety; i.e. esters, amides, ester-amides of the following formulae:

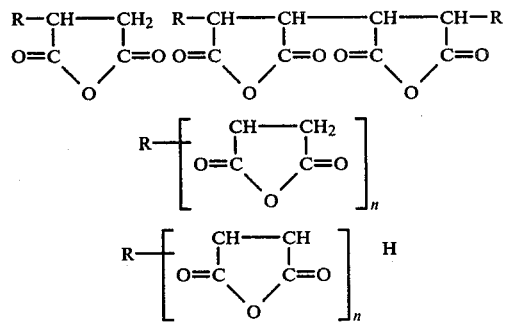

where n is, for example 1–5, or even 25 or more in certain instances.

These are sold by Petrolite Corporation's Bareco Division under the CERAMER ® trademark.

This invention includes at least one organopolysiloxane fluid. These fluids are also referred to as silicone fluids and are distinguished from silicone elastomers and resins. They are basically dimethylpolysiloxane fluids, which are substantially linear in nature. The structure of the dimethylsilicone fluid is shown by the following general formula where n is the number of units:

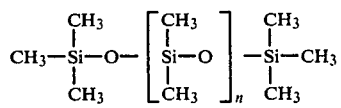

By substitution of some of the methyl groups with other organic or organo functional groups, such as vinyl, phenyl, trifluoropropyl, and amino, other organopolysiloxane fluids can be produced. The table shown on the following page, shows the properties of various unsubstituted dimethylsilicone fluids as well as those dimethylsilicone fluids having between 10 mole percent to about 35 mole percent substitution of phenyl groups.

TABLE I

| | Unsubstituted Dimethylsilicones | | | Substituted Dimethylsilicones | | |
|---|---|---|---|---|---|---|
| | | | | 10% Phenyl Methyl | 25% Phenyl Methyl | 45% Phenyl Methyl |
| Viscosity, Cstk. at 25° C. | 100 | 1,000 | 10,000 | 100 | 100–150 | 500 |
| Specific Gr. 25/25 | 0.97 | 0.97 | 0.97 | | | |
| $N_n{}^{25}$ | 1,403 | 1,404 | | | | |
| Flash pt. Min. °F. (Open) Cup | 600 | 600 | 600 | 520 | 570 | |
| Dielectric Constant | 2.74 | 2.76 | 2.7 | | | |
| V.T.C.* | 0.60 | 0.62 | 0.61 | 0.62 | 0.76 | 0.83 |
| Freezing Pt. °F. | −67 | −58 | −50 | | | |
| Thermal Conductivity** | .00037 | .00038 | | | | |
| Surface Tension, Dynes Per CM. at 25° C. | 21 | 21 | 21 | | | |
| Specific Heat Gal/G° C. | 0.35 | 0.35 | | | | |

*V.T.C. (Viscosity Temperature Coefficient) is $\dfrac{V_{210} - V_{110}}{V_{100}}$ where $V_{100}$ is the viscosity

**Thermal Conductivity $\dfrac{Cal. \times Cm.}{Sec. \times Cm^2 \times °C.}$ at 50° C.

Generally organopolysiloxane fluids are available as mixtures of polymers of varying chain length. It has been found for purposes of the invention that the viscosity of the silicone fluids is a measure of the effectiveness. Silicone fluids can be used which have a viscosity range up to about 100,000 centistokes up to about 10,000 centistokes. Most preferably, the viscosity is in the range of about 300–400 centistokes. Apparently, as the viscosity becomes too great, there is difficulty in penetration of the silicone fluids into the surface to be protected. When the viscosity becomes too low, the average chain length of polymer is apparently too small to provide adequate protection.

The exact choice of an organopolysiloxane fluid or fluid mixture as described above, will depend upon the identify of the surface to be protected. It has been found that for most applications, the standard unsubstituted dimethylpolysiloxane fluid is an excellent choice. In other instances, it has been found that the inclusion of up to about 10% by weight, based on the weight of the dimethylpolysiloxane fluid, of a commercially available amino-substituted dimethylpolysiloxane fluid provides increased adherence to the surface to be protected. This combination is particularly advantageous for treatment of metal surfaces. The use of the phenyl and other substituted dimethylpolysiloxane fluids is a matter of choice, depending upon the material to be treated and/or the environmental stress to which the surface will be exposed.

The silicone fluid or mixture of fluids is used in the form of a water emulsion. The amount of water which can be used is preferably from about 65% to about 660% by weight, based on the weight of the silicone fluid. However, the amount of water can be as high as about 5000% by weight if desired.

It is believed that the small particle size of the silicone in the emulsion (usually less than about ½ micron) greatly facilitates penetration of the silicone into the surface to be protected.

Emulsions of silicone fluids in water are available from several major chemical companies, including for example, General Electric Company; Silicone Products Department of Waterford, New York; Union Carbide Corporation; Silicones Division of West Virginia; and Dow Corning Corporation of Midland, Michigan. The silicone emulsions usually contain from about 35% to about 50% by weight of a silicone fluid or fluid mixture, with the remainder being mostly water and small amounts of emulsifier and adjuvant materials such as a rust inhibitor. A typical emulsion contains 35 parts by weight dimethylpolysiloxane, 10 parts by weight of an emulsifier, such as nonylphenol, 5 parts by weight of a rust inhibitor, such as sodium nitrite, and 65 parts by weight of water.

A wide variety of metal salts such as zinc salts can be employed in the composition of this invention. In general, the preferred form of metal salts added comprises zinc salts, preferably zinc carbonates and carboxylates, as illustrated by zinc octoate and zinc ammonium carbonate.

The following examples are presented for purposes of illustration and not of limitation.

EXAMPLE 1

A high viscosity emulsion dressing of about 20-40 poises was prepared according to the present invention as follows:

Part A

Molten wax (4.25 parts of CERAMER ® 67) was added to:

| Component | Parts by Weight |
|---|---|
| Zinc octoate at 18% Zn | 0.12 |
| Diethanolamine | 0.35 |

When the addition was complete the temperature of the mixture was raised above 113° C. for about 5 minutes.

In Part B deionized water was added at 15 parts to a separate, master vessel and then preheated to about 96° C. Next, ammonium hydroxide at 0.17 parts was added to the hot water with the necessary precautions against its loss. Part A was slowly added with vigorous agitation to Part B which was subsequently cooled to room temperature by mixing in 10 parts of deionized water at 15°–26° C.

In Part C and to a separate vessel were added:

| Component | Parts by Weight |
|---|---|
| An emulsion of dimethyl polysiloxane having a viscosity of about 1000 cps and solids at 50% | 3.80 |
| An emulsion of dimethyl polysiloxane having a viscosity of about 60,000 cps and solids at 35% | 5.00 |
| Rohm & Hass' Triton X-45 | 1.50 |
| Deionized water | 27.00 |

The blend of the above silicone emulsions and Triton X-45 was premixed for 10 minutes. Mixing was maintained with deionized water being added and then continued for 10–15 minutes prior to adding Part C (with mixing) to combined Parts A and B.

In Part D, the following were added to a separate vessel:

| Component | Parts by Weight |
|---|---|
| Isopropyl Alcohol | 1.00 |
| Methyl Paraben | 0.05 |
| Propyl Paraben | 0.05 |
| Hydrocarbon Solvent | 15.00 |
| Poly(alpha-olefin) (VYBAR ® 825 Petrolite Corporation, Bareco Division) | 5.20 |

The methyl and propyl parabens were predissolved in isopropyl alcohol. Hydrocarbon solvent and VYBAR ® 825 were then added and mixed for 10 minutes or until uniform. Following this, Part D was added (with mixing) to combined Parts A, B, and C.

In Part E, a 2% solution of Carbopol 934 (which is carboxy vinyl polymer sold by B. F. Goodrich Co.) was prepared by mixing it with 98% of deionized water until homogeneous and having constant viscosity.

Added with mixing were 10.93 parts of the 2% Carbopol 934 to the combined Parts A, B, C and D. The mixing was continued for 15 minutes. Following this a premixed blend of the following were added with mixing:

Part F

| Component | Parts by Weight |
|---|---|
| Morpholine (Dow Chem. Co.) | 0.27 |
| Deionized water | 0.31 |

The completed batch was mixed until homogeneous.

The process of example 1 was repeated to prepare the following emulsion dressings of various viscosities. The viscosity of the emulsion dressing was varied by changing the concentrations of (1) Carbopol 934, (2) VYBAR ® 825, (3) Solvents, (4) Waxes and emulsifiers and adjusting the pH to 9.5 using ammonium hydroxide to yield the products of the following examples:

(Ex. 2) a low viscosity emulsion dressing (about 1–9 poises)

(Ex. 3) a medium viscosity emulsion dressing (about 10–19 poises), and (Ex. 4) a very high viscosity emulsion dressing (above 40 poises).

The following are representative examples of the preferred ratios of ingredients which can be employed to yield suitable products.

| Component | Parts by Weight |
| --- | --- |
| Poly(alpha-olefin) (VYBAR ® 825) | 0.60 to 8.00 |
| Wax | 0.50 to 6.00 |
| Zinc Octoate at 18% Zn | 0.05 to 0.50 |
| Diethanolamine | 0.10 to 0.80 |
| Deionized water | 84.93 to 21.90 |
| silicone emulsion[1] | 2.00 to 10.00 |
| silicone emulsion[2] | 2.00 to 10.00 |
| Triton X-45 | 0.10 to 3.00 |
| Isopropyl alcohol | 0.10 to 3.00 |
| Methyl Paraben | 0.01 to 0.10 |
| Propyl Paraben | 0.01 to 0.10 |
| Hydrocarbon Solvent | 6.00 to 20.00 |
| Carbopol 2% solution | 4.00 to 16.00 |
| Morpholine | 0.10 to 0.60 |

[1] An emulsion of dimethyl polysiloxane having a viscosity of about 1000 cps and solids at 50%.
[2] An emulsion of dimethyl polysiloxane having a viscosity of about 60,000 cps and solids at 35%.

The products of this invention are useful in
—cleaning
—restoring or improving the appearance in terms of gloss, uniformity and color
   —maintaining the appearance
   —protecting and preserving appearance and longevity of objects made from vinyl, leather, rubber, elastomers, natural and synthetic polymers, sealed and finished woods, painted metal such as automobile finishes, etc.

Products of this invention are directed toward a wide scope of uses such as encountered in the household, sports, industrial, do-it-yourself maintenance or automobiles, recreational vehicles, boats, motorcycles, airplanes, etc.

Specific illustration of products on which the products of this invention can be employed include the following:
1. Automotive vinyl tops
2. Automotive truck, recreational vehicles—tires
3. Rubber and elastomeric gaskets used in the above
4. Rubber and elastomeric hoses
5. Rubber and elastomeric bumpers
6. Snowmobiles—rubber and/or elastomeric belts
7. Boats—rubber and/or elastomeric gaskets, vinyl appointments, etc.
8. Water sports—under-the-water-swimsuits, fins, belts, water ski bindings, etc.
9. Winter sports—ski boots (leather or vinyl)
10. Outdoor recreation sports—hiking boots, leather gear, etc.
11. Furniture featuring vinyl or leather, such as sofas, chairs, etc.
12. Domestic objects made out of natural or synthetic polymers, such as Formica ®
13. Leather or vinyl objects such as gloves, belts, luggage, carrying cases, hand bags, accessories, etc.
14. Furniture featuring sealed wood and simulated wood containing styrene or similar materials used to manufacture simulated wood articles.

We claim:
1. A wax formulation characterized by containing a liquid poly(alpha-olefin) and a fluid silicone.
2. The wax formulation of claim 1 which also contains a metal salt.
3. The wax formulation of claim 2 where the metal salt is a zinc salt.
4. The emulsified composition of claim 1.
5. The emulsified composition of claim 2.
6. The emulsified composition of claim 3.

* * * * *